United States Patent [19]
Canetti et al.

[11] Patent Number: 5,469,507
[45] Date of Patent: Nov. 21, 1995

[54] SECURE COMMUNICATION AND COMPUTATION IN AN INSECURE ENVIRONMENT

[75] Inventors: Ran Canetti, Tel Aviv, Israel; Amir Herzberg, New York, N.Y.

[73] Assignee: International Business Machines Corporation, Armonk, N.Y.

[21] Appl. No.: 203,965

[22] Filed: Mar. 1, 1994

[51] Int. Cl.$^6$ .................................................. H04K 1/00
[52] U.S. Cl. ............................... 380/30; 380/23; 380/25
[58] Field of Search ................................. 380/23, 24, 25, 380/21, 28.30

[56] References Cited

U.S. PATENT DOCUMENTS

| | | | |
|---|---|---|---|
| 4,956,863 | 9/1990 | Goss | 380/30 |
| 5,159,633 | 10/1992 | Nakamura | 380/30 |
| 5,200,999 | 4/1993 | Matyas et al. | 380/25 |
| 5,241,599 | 8/1993 | Bellovin et al. | 380/21 |
| 5,371,794 | 12/1994 | Diffie et al. | 380/21 |

FOREIGN PATENT DOCUMENTS

| | | | |
|---|---|---|---|
| 5022283 | 1/1993 | Japan | 380/30 |

OTHER PUBLICATIONS

IBM Technical Disclosure Bulletin vol. 28 No. 3 Aug. 1985 pp. 1065–1069.
R. Bird et al.; "Systematic Design of a Family of Attack–Resistant Authentication Protocols"; IEEE Journal on Selected Areas in Communications, vol. 11, No. 5, pp. 679–693.
M. Bellare et al.; "Models of Entity Authentication"; Advances in Cryptology: Proc. of Crypto 93, Aug. 1993.
R. Ostrovshy et al.; "How to Withstand Mobile Virus Attacks"; Proc. of the 10th Annual ACM Symposium on Principles of Distributed Computing, Montreal, Quebec, Canada, 1991, pp. 51–59.

*Primary Examiner*—Tod R. Swann
*Attorney, Agent, or Firm*—Whitham, Curtis, Whitham & McGinn; Douglas Cameron

[57] ABSTRACT

A mechanism which secures the communication and computation between processors in an insecure distributed environment implements efficient "compilers" for a protocol between processors. The protocol is one that assures some input-output relation when executed by processors which are not all trusted but with secret and authenticated communication links between every two processors. This protocol is transformed by a compiler into a protocol that guarantees essentially the same input-output relations in the presence of (the same type of) insecure processors and insecure communication links. Additionally, a method maintains secret values for a sequence of periods, each secret value being shared by two or more processors for one or several periods, where the processors are connected by a communication network.

Another mechanism establishes different cryptographic keys established for each period of communication. Essentially, the effect of exposures is contained to the period in which they occur, or to a minimal number of following periods, and the effect of exposures is contained to the processors exposed. At each period a processor is called *nonfaulty* if the adversary does not control it. A processor is called *secure* at a given period if it is non-faulty and also has a secret key, unknown to the adversary.

15 Claims, 6 Drawing Sheets

SECURE COMMUNICATION AND COMPUTATION IN AN INSECURE ENVIRONMENT

CROSS-REFERENCE TO RELATED APPLICATION

The invention described in this application is related to the invention described in our co-pending patent application Ser. No. 08/203,973 filed concurrently herewith for "A Mechanism for Keeping a Key Secret from Mobile Eavesdroppers" now U.S. Pat. No. 5,412,723 issued May 2, 1995. The disclosure of that application is incorporated herein by reference.

BACKGROUND OF THE INVENTION

1. Field of the Invention

The present invention generally relates to communication and computation among several processors connected by a communication network. Examples of such systems include distributed processing systems and client/server data processing systems. More particularly, the invention is directed to a method of assuring secure communication and distributed computation in a distributed environment which contains insecure communication links and processors.

2. Description of the Prior Art

The need for ensuring secure communication between processors communicating over insecure channels is becoming increasingly acute. Solutions are usually based on cryptographic methods that provide secrecy and authentication of the information sent among a pair (or a set) of processors if the processors, but only the processors, know some secret cryptographic key. However, in many applications, processors may occasionally fall under the control of a malicious adversary. The adversary would be able to find the cryptographic keys stored in the controlled processors and foil the security of the communication.

At any given instant in time, a large fraction of the processors may be controlled by a malicious adversary. The identities of the processors controlled by the adversary may change with time, as the adversary gains control of more processors and is expelled from others. When a processor is controlled by the adversary, the adversary learns the information held by the invaded processor and may even maliciously alter the behavior of this processor. The adversary may also have access to all, or a subset of, the communication links. That is, the communication links may be tapped, and even tampered with so that messages may be maliciously lost, modified or generated. Such adversarial activity also may be maliciously coordinated.

SUMMARY OF THE INVENTION

It is therefore an object of the present invention to provide a mechanism for securing the communication and computation between processors in an insecure distributed environment.

It is another object of the invention to provide a method to maintain secret values for a sequence of periods, each secret value being shared by two or more processors for one or several periods, where the processors are connected by a communication network.

According to a first aspect of the invention, there are provided efficient "compilers" for a protocol between processors. The protocol is one that assures some input-output relation when executed by processors which are not all trusted but with secret and authenticated communication links between every two processors. This protocol is transformed by a compiler according to the invention into a protocol that guarantees essentially the same input-output relations in the presence of (the same type of) insecure processors and insecure communication links. Furthermore, these constructions essentially retain the resiliency of the protocol (with respect to the number of maliciously controlled processors).

In the description of the invention, the term "virus" is used to refer to a maliciously controlled processor. In most of the description of the invention, the identities of the processors controlled by the malicious adversary changes over time, corresponding to the adversary gaining control of new processors and losing control of others as a continuing dynamic process. This model is similar to the behavior of computer viruses and "worms".

There are several cases. The viruses may be "stationary", they may be "mobile eavesdroppers", or they may be "mobile Byzantine". In the stationary case, once a party becomes faulty (i.e., it is invaded by a virus), it remains faulty throughout the computation. The total number of faults does not exceed a certain limit, t. In the case of mobile eavesdroppers, viruses can "move" between parties, as long as in each communication round the number of faulty parties does not exceed a certain limit, t. In this case, it is assumed that the faulty parties continue to follow their protocols. However, once a party has been invaded, the entire contents of its memory becomes known to the adversary controlling the viruses. In the case of viruses which are mobile Byzantine, in addition to the capabilities viruses had in the previous case, faulty parties may now diverge from the protocol, and their memory may be changed.

For each of the cases outlined above, the invention provides a "secure compiler". The input of the compiler, C, is a protocol $\pi$ that assures some input-output relationship in the presence of some type of faults within parties, assuming secure communication. The output, $C(\pi)$, of the compiler is a protocol that assures essentially the same input-output relationship in the presence of the same type of faults within parties and insecure communication.

According to another aspect of the invention, there is provided a mechanism whereby different cryptographic keys are established for each period of communication. Essentially, the effect of exposures is contained to the period in which they occur, or to a minimal number of following periods, and the effect of exposures is contained to the processors exposed. More precisely, at each period a processor is called *nonfaulty* if the adversary does not control it. A processor is called *secure* at a given period if it is non-faulty and also has a secret key, unknown to the adversary. In our related patent application, U.S. Pat. No. 5,412,723, we show a method to ensure that if processor i is secure at period p, processor i' is non-faulty at period p+1, and the adversary does not intercept a message sent from i to i' on the end of period, p, then i' would be secure at period p+1. As described below, the present invention extends this result to pairs of processors. The invention also may be extended to arbitrary sized sets of processors.

A pair of processors is called "secure" at a given period if both processors are nonfaulty, and the adversary does not have any information on the key each of them keep to communicate with the other. This does not require that the two processors would have the same key. It only requires that the adversary would not know the key. A pair of processors (i,j) may be secure while for some non-faulty k, the pair (i,k) is insecure. The method of the present invention ensures that if i', j' are non-faulty at period p+1, then they are also secure, if there is a pair of processors i,j which is secure at period p (possibly i=j) where the adversary does not intercept a message sent from i' to i and a message sent from j' to j at the end of period p.

BRIEF DESCRIPTION OF THE DRAWINGS

The foregoing and other objects, aspects and advantages will be better understood from the following detailed description of a preferred embodiment of the invention with reference to the drawings, in which.

DETAILED DESCRIPTION OF A PREFERRED EMBODIMENT OF THE INVENTION

Figure 1:
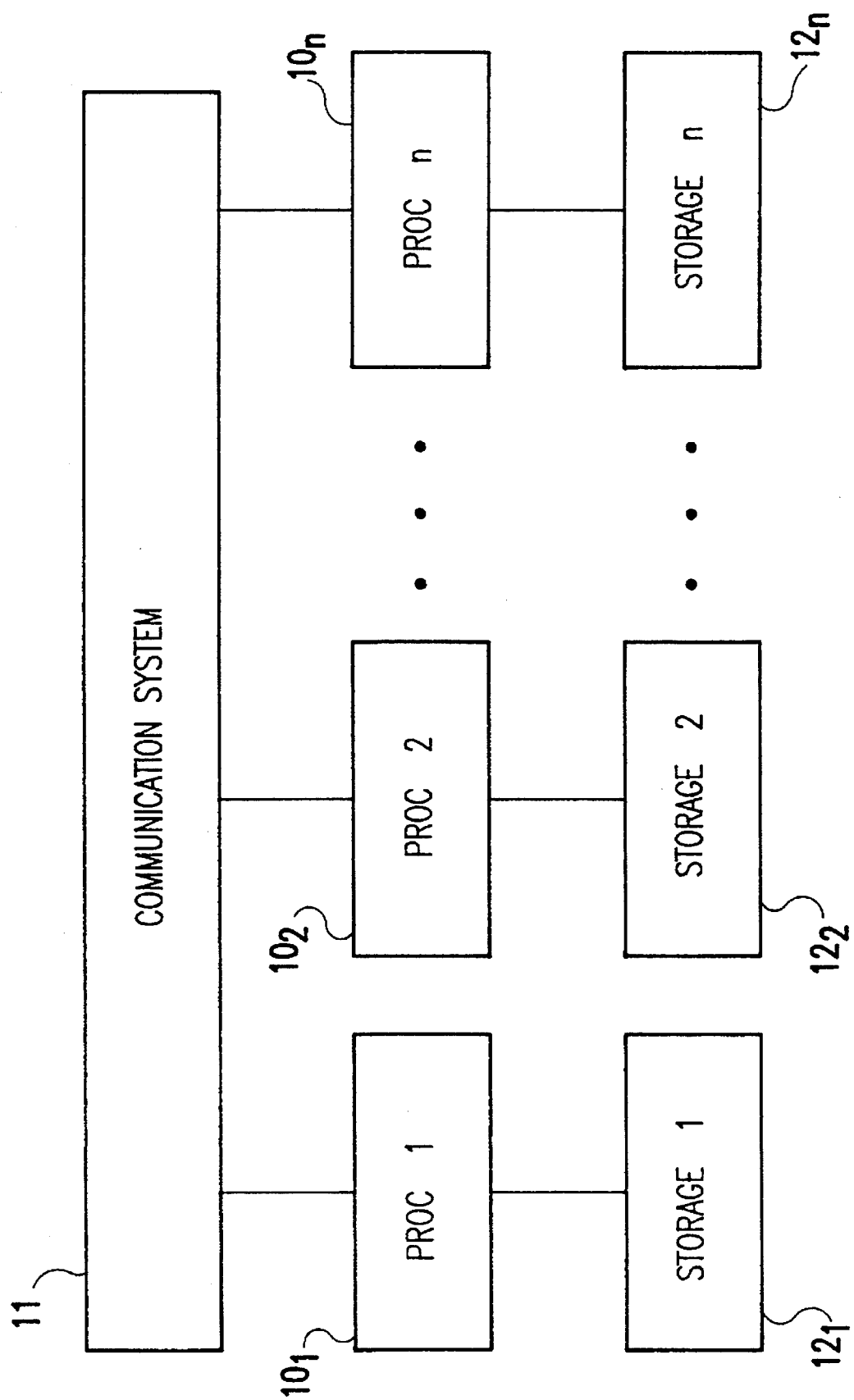
FIG. 1 is a block diagram showing a distributed dam processing system of the type on which the invention may be implemented.

Referring now to the drawings, and more particularly to FIG. 1, there is shown a typical distributed data processing system, sometimes referred to as a client/server network, comprising a plurality of servers and clients connected via a communication network. A client/server system is a distributed system comprising a plurality of processors $10_1$ to $10_n$ interconnected by a communication network 11. The communication network 11 may be, for example, a local area network (LAN), a wide area network (WAN) or other similar network. The processors may be configured as clients or servers or both and are provided with respective storage devices $12_1$ to $12_n$, some or all of which may be accessible all or less than all the processors. This type of architecture makes use of the "distributed intelligence" of the servers and clients (i.e., workstations) as intelligent, programmable devices, thus exploiting the full computing power of each. The advantage of the client/server architecture is that the clients and servers work together to accomplish the processing of the application, thereby increasing the processing power. Such a distributed data processing system may be connected as a local area network (LAN) or wide area network (WAN), and the servers may be microcomputers, minicomputers or mainframes or a combination. Thus, it will be appreciated that the system shown in FIG. 1 is generic in its illustration, and in a specific installation may be considerably more complex. The present invention applies to server and clients alike, and for purposes of this disclosure we will refer to servers, or sometimes more generally to processors or parties.

A secure "compiler" may be defined as follows. Consider a synchronous network of n parties. Recall that the input of our compiler, C, is a protocol, π, that assures some input-output relationship in the presence of some type of faults within parties, assuming secure communication. The output, C(π), of our compiler, is a protocol that assures "essentially" the same input-output relationship in the presence of the same type of faults within parties, and insecure communication.

Clearly, an adversary may "disconnect" (some of) the links, thereby preventing communication over them. It is possible to deal with this by sending over other links, if the amount of links disconnected is limited. We will simply assume that the original protocol, π, is capable of dealing with link failures, i.e., this is a protocol for secure but unreliable communication.

In a more subtle attack, a strong adversary may be able to "exchange" a processor by a "malicious ghost", such that the other processors are not aware that they are communicating with the adversary controlled "ghost" rather than with the correct processor. This situation is unavoidable; however, the "exchanged" processor may detect this. Implicitly, we assume that if a processor detects that it has been "exchanged by a ghost", then that processor will initiate an alarm and the results of the computation are irrelevant. The goal is that the adversary will not gain any advantage (except the ability to abort the execution). We therefore emulate the situation where an adversary may, in addition to controlling some of the processors, also press an "abort button" which would make the computation invalid. Therefore, with respect to this strong adversary, we require that the output C(π), of our compiler, would have the same input-output distributions relationship as that of the original protocol π when run with some adversary which has the same control of processors but no control over links, but also with the ability to "abort" the protocol whereby all outputs are set to some special value ⊥.

These requirements imply that if the original protocol, π, is secure (namely, the faulty parties gather no information from the computation, other than their inputs and specified outputs) then the compiled protocol C(π) is secure as well. Note that we do not require that all parties output ⊥ unanimously (say, in case of link-failure). As will be seen in the sequel, such a unanimity requirement is impossible to implement, in some scenarios. Moreover, it not necessary since, once a processor has output ⊥, it may alert an operator who will notify other parties in some ways external to the network. This scenario is related to the message authentication problem, where entities authenticate each other using insecure communication links. See, for example, Ray Bird, Inder Gopal, Amir Herzberg, Phil Janson, Shay Kutten, Refik Molva, and Moti Yung, "Systematic design of a family of attack-resistant authentication protocols", *IEEE Journal on Selected Areas in Communications*, vol. 11, no. 5, pp. 679–693, June 1993, Special issue on Secure Communications, and Mihir Bellare and Phil Rogaway, "Models of entity authentication", *Advances in Cryptology: Proc. of Crypto* 93, August 1993. However, there are two major differences. In the case of the present invention, the adversary cannot interact separately and repeatedly with each party, in order to enhance its capabilities. This is so, since the network is synchronous; whenever some party identifies some unexpected situation, it outputs ⊥ and halts. In addition, the solutions provided by the invention concentrate on allowing the adversary to control some of the processors for some of the time, whereas the cited publications assume that all of the processors are completely secure and trusted.

In our implementation, we distinguish three cases, described below. In all three cases we assume that the network is initialized so that each two parties share a secret, random session key.

Stationary faults. The faults are "stationary". That is, once a processor becomes malicious (i.e., it is "invaded" by a virus), it remains faulty throughout the computation. We do not distinguish between the cases where the identities of the malicious processors are chosen before the computation starts, or during the computation itself. The solution for this case is simple. First, encrypt each message using part of the key common with the recipient party. Next, apply some message authentication protocol to the encrypted message, using another part of the common key. Note that the adversary may still remove messages; however, we assume this is dealt with by the original protocol $\pi$. It can be easily seen that if the original protocol is t-resilient (i.e., the input-output relations are assured as long as at most t parties become faulty), then the compiled protocol is also t-resilient.

When limited randomness is available from physical or other sources, it could be used to enhance the randomness of the invention by using additional random inputs to the computation of intermediate values or of new secrets/round keys.

Mobile eavesdroppers. The faults (viruses) can "move" between parties, as long as in each communication round the number of faulty parties does not exceed a certain limit, t. In this case, we assume that faulty parties continue to follow their protocols. However, once a party has been invaded, the entire contents of its memory becomes known to the adversary controlling the viruses. Clearly, the protocol for the stationary case would fail here. Once a party has been faulty, all its private information is known to the adversary, even when the fault "moves on". In this way, within few rounds, the adversary will know all the private information of all the parties. Moreover, in a first look a solution seems impossible. Once the adversary got hold of a party, and controls all the links outgoing from this party, it can "simulate" this party (from the point of view of the rest of the network) and continue doing so even when the fault has "moved on". We overcome this difficulty by making sure that in this case, the disconnected party itself will output ⊥.

Figure 2:
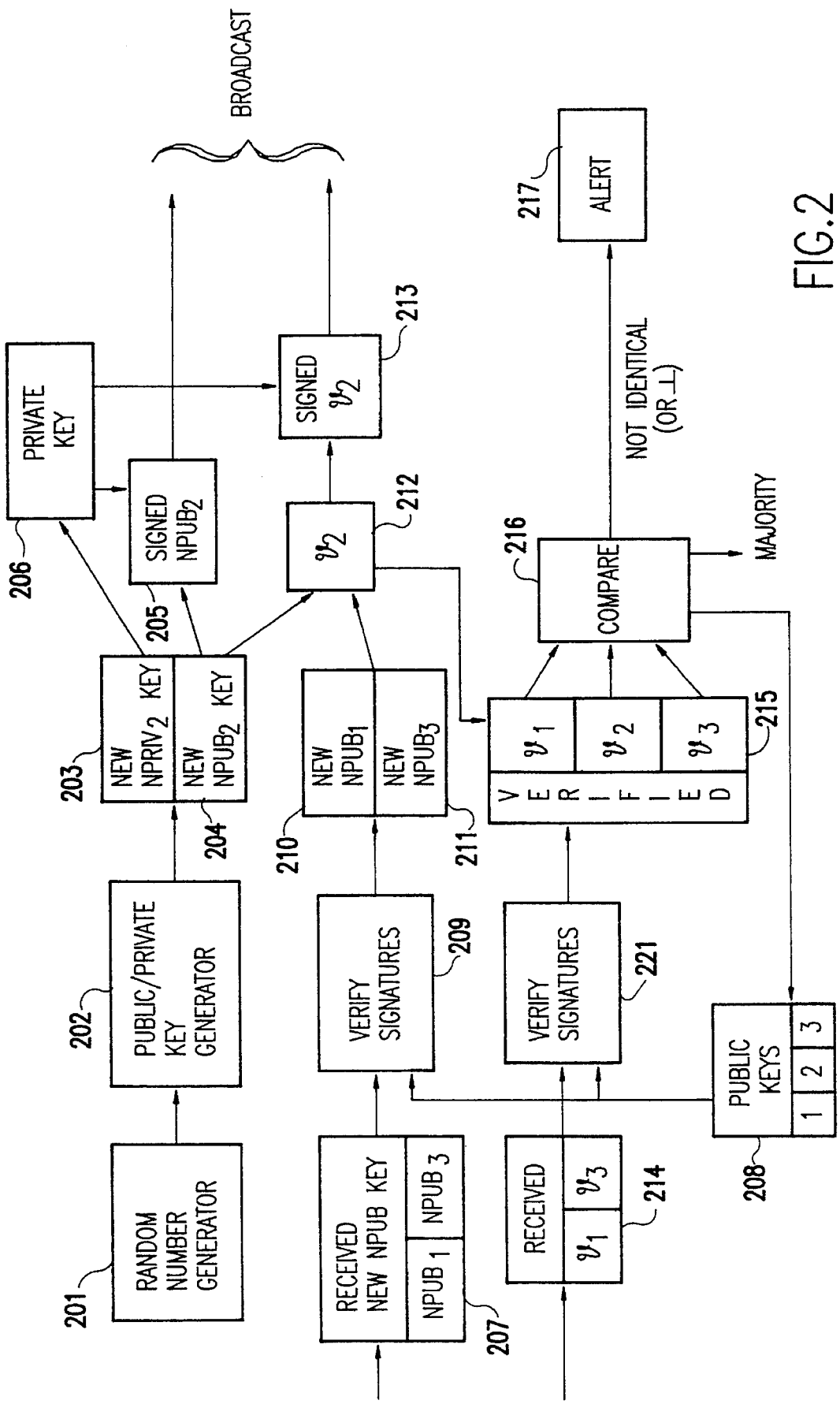
FIG. 2 is a functional block diagram showing the flow of the process according to a first embodiment of a first aspect of the invention.

A first embodiment of the invention proceeds as follows. Messages are still authenticated and encrypted using the secret session keys. However, we use a public key cryptosystem in order to choose new session keys in each round. FIG. 2 illustrates the scheme according to a first embodiment of the invention in order to recover from a fault once it has "moved on". FIG. 2 assumes that there are three processors, $P_1$, $P_2$ and $P_3$, in the distributed data processing system, and what is specifically illustrated is the operations performed at processor $P_2$, the operations at processors $P_1$ and $P_3$ being the same.

Step 1. In each round each processor $P_i$ selects a new pair of public and private keys, and broadcasts the public key, signed by the old private key. This is done by using a random number generator 201 and a public/private key generator 202. The new private key, NPRN2, for processor $P_2$ is stored in register section 203, and the new public key, $NPUB_2$, is stored in register section 204. The new public key, $NPUB_2$, is then is signed in operation block 205 by the old private key held in register 206 and broadcast to processors $P_1$ and $P_3$. The new public keys, $NPUB_1$ and $NPUB_3$, broadcast by processors $P_1$ and $P_3$ are received by receive function block 207 and temporarily held in respective register sections of that block.

Step 2. Optionally, each processor $P_j$ "echoes" the public key received from each of the other processors $P_i$, signed using the (old) session key of $P_i$ and $P_j$, back to the sending processor, $P_i$.

Step 3. $P_j$ broadcasts the vector $v_j$ of all public keys received in this round, signed using the (old) private key of $P_j$. More specifically, the old public keys are stored in register 208 which is accessed by operation block 209 to verify the signatures of the received new public keys from processors $P_1$ and $P_3$. The verified new public keys $NPUB_1$ and $NPUB_3$ are temporarily held in respective registers 210 and 211 from which the new public keys are read and, together with the public key, $NPUB_2$, held in register section 204, form vector $v_2$ in operation block 212. The vector $v_2$ is signed in operation block 213 using the old private key in register 206 and then broadcast to processors $P_1$ and $P_3$. The vectors $v_1$ and $v_3$ broadcast by processors $P_1$ and $P_3$, respectively, are received in receive function block 214 and temporarily held in respective register sections of that block.

Step 4. Operation block 221 of each processor checks all signatures of the received vectors held in receive function block 214 using the old public keys held in function block 208. The verified vectors $v_1$ and $v_3$ plus vector $v_2$ from block 212 are stored in register 215. All the claimed values of the public keys of each other party are compared in majority compare logic 216. If there is any disagreement between new public keys claimed for any processor, or any invalid signature, an appropriate warning is issued in alert function block 217. If more than t parties disagree on a value (or their signatures were invalid), then ⊥ is output and the execution halted. Otherwise, for each other party the majority value for its public key is adopted and stored in block 208 for the next round.

Step 5. Erase old private keys by reading the new private key in register 203 and overwriting the value stored in block 206.

Steps 3 to 4 are necessary. Without them, the adversary could "get in between" a link between two parties, P,Q, that were both faulty at the previous round and are nonfaulty in the current round. Namely, the adversary could act as P in the eyes of Q without being caught. Furthermore, at the same time the adversary can act as Q in the eyes of P. It can be seen that our construction retains the resiliency of the original protocol. Here the resiliency is measured as the maximum allowed number of faulty parties in each round.

Figure 3:
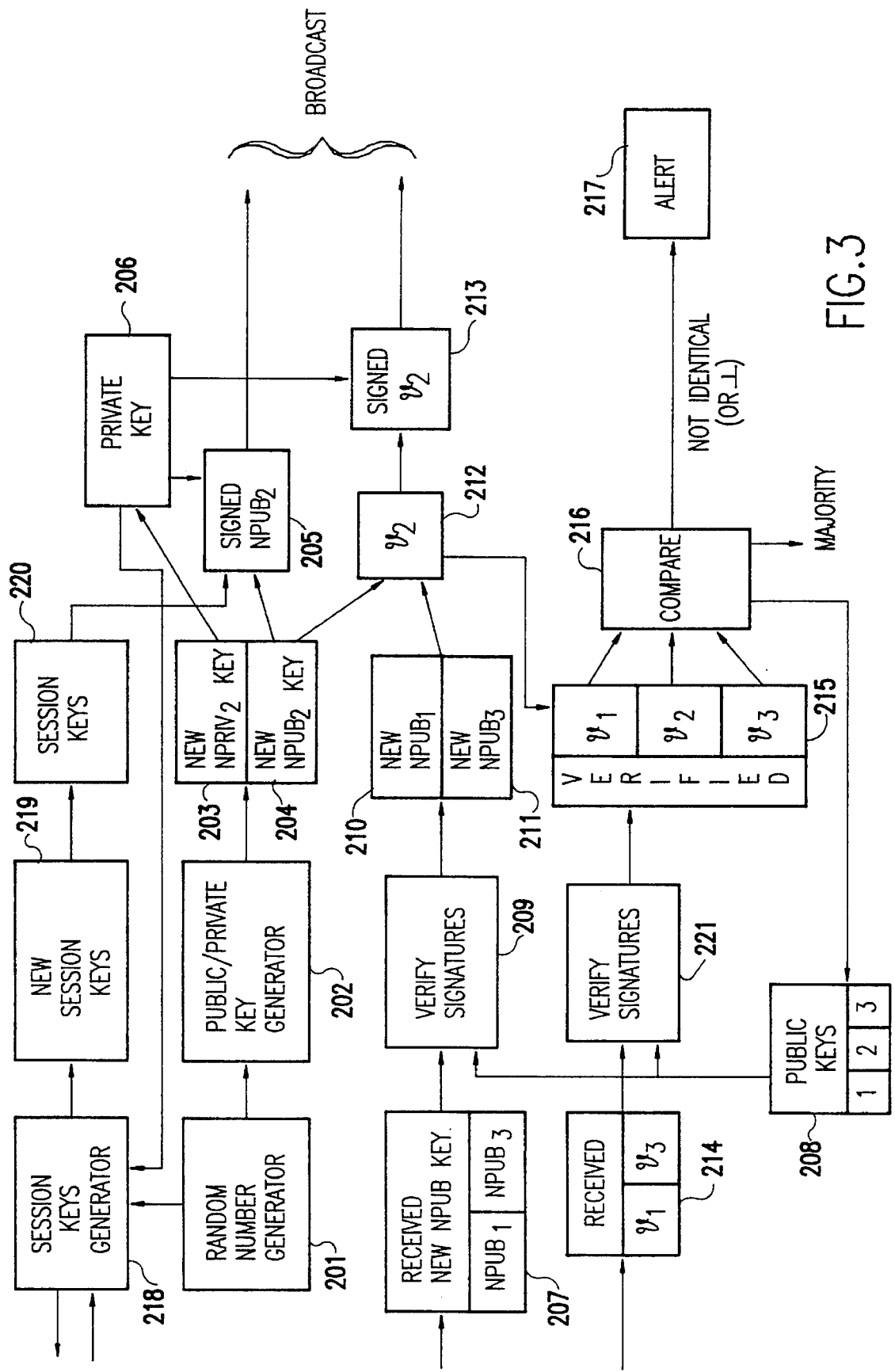
FIG. 3 is a functional block diagram showing the flow of the process according to a second embodiment of a first aspect of the invention.

A second embodiment of the invention is shown in FIG. 3, which is similar to FIG. 2 and wherein like reference numerals represent the same operations. In this embodiment, session keys are used by inserting the following step between steps 4 and 5:

Step 6. Each pair of processors use the new public keys to agree on a fresh session key. More specifically, a session key generator 218 receives the output of random number generator 201 and generates a session key which is exchanged with the other processor of the pair. The new session keys, one generated by session key generator 218 and the other generated by a corresponding session key generator in the other processor are temporarily held in register 219. The old session keys held in block 220 are used in step 2 instead of the old private key in block 206. As with the private key, the old session keys are overwritten in block 220 after the verification.

In another embodiment, in step 1 the public key would be sent to each party authenticated by the shared session key. In yet another embodiment, the signature in steps 1 and 2 would be omitted unless a warning was issued before, and whenever a warning is issued, the procedure is restarted.

Mobile Byzantine viruses. Let us first note that if no further assumptions are made on the security of the network, then no solution to our problem exists in this model. As in the eavesdropping case, once the adversary knows all the secret information of some party, it can "disconnect" this party from the rest of the network and "simulate" this party on all its outgoing links, even after this party is no longer faulty. However, if the viruses are only eavesdropping, then the adversary is unable to "simulate" the rest of the network in the eyes of the disconnected party. Thus, this party will notice that something went wrong, and will output ⊥. If the viruses are allowed to modify the contents of the memories of faulty parties, then the adversary will be able to "disconnect" a faulty party, and "convince" this party that it is communicating with the real network, *even after this party is no longer faulty!*

There are two ways to overcome this difficulty. First, one may assume a "core", well protected memory which is untouchable by the virus. This memory is required to support both read and write operations. This brings us back to the solution of the mobile eavesdropping viruses.

A second possible assumption is that not all the links in the networks are insecure; i.e., the adversary does not have enough resources to tamper with all the links.

According to another aspect of the invention, them is provided a solution to the *mobile faults* scenario where an attacker gains, from time to time temporary control of the processor, so that eventually all processors may be broken into (but not at once). This scenario has been studied by Rafail Ostrovsky and Moti Yung in "How to withstand mobile virus attacks", *Proc. of the* 10*th Annual A CM Symposium on Principles of Distributed Computing,* Montreal, Quebec, Canada, 1991, pp. 51–59. Ostrovsky and Yung showed how to securely compute any function and how to securely maintain a distributed database. However, their scheme assumes that the links are secure and does not provide mechanisms to ensure link security (i.e., cryptographic link keys).

The present invention extends our invention disclosed in U.S. Pat. No. 5,412,723 which deals with a key unique to each processor, and not with keys shared between processors. The results of that invention may be used to provide, at each period and at each nonfaulty processor, a secret key which is known only to this processor and to the "user" which knows all original keys. This requires complete trust of the "user", while the present invention, which treats all parties equally (and none is completely trusted), places heavy communication and computation requirements on all parties.

The two solutions deal with the two major scenarios of key distribution and authentication systems such as Kerberos (implemented in DCE) and NetSP. The present invention can be used to secure communication between processors in the network, and our invention disclosed in U.S. Pat. No. 5,412,723 can be used to authenticate the user using his password or smartcard (from which we generate all original keys).

In the first aspect of the present invention, we dealt with a problem very similar to the one of the second aspect. In the first aspect, we allowed the adversary to intercept all messages; however, we assumed that the adversary cannot modify the memory of processors, and the solution relied both on the use of public-key cryptography and on the existence of a trusted source of unpredictable randomness in each processor. Therefore, the first and second aspects of the present invention have complementing properties, as the second aspect of the invention allows arbitrary changes to the storage of adversary-controlled processors and does not use either public key or trusted source of randomness. In fact, as a part of the invention we show how to combine both methods.

This aspect of the invention supplies pairs of processors with a shared secret key. It may appear that an alternative to withstand adversary-controlled processors would be to use public key techniques, such as RSA (for Revist, Shamir and Arielman). In fact, public key techniques does not give any protection against the kind of threat we consider where the adversary controls at each period a different set of processors (mobile faults). Even using public key techniques, once a processor is controlled, any secret (private) information stored in it becomes known to the adversary, and in particular any cryptographic keys.

When an adversary controls a processor, we allow it to read and modify all of the storage of that processor. However, when the processor becomes non-faulty, we assume that it runs the correct software. This assumption seems reasonable as it may be supported by several practical means, such as periodical re-booting followed by comparison against archival copies or by hardware read-only to the system software (e.g., system software on ROM with dedicated address space). This may be contrasted with several earlier works which dealt with providing security in an untrusted processor environment, based on a small tamper-resistant hardware module which is assumed perfectly secure.

The invention provides secure pseudo-random numbers (keys) shared by pairs of processors in a way which provides security against attackers which may control all processors and communication links (but not all of them at once). Furthermore, the schemes implemented by the invention are simple, efficient and provably secure.

We present schemes for maintaining secret keys shared between pairs of processors in the presence of a mobile, transient adversary that occasionally breaks into servers in order to gather information on the keys. When the adversary breaks into (or controls) a server, it is able to read and modify all of the storage. However, when the processor recovers (becomes nonfaulty), we assume it executes the original, non-corrupted program.

The idea underlying the schemes according to the invention is to use a different key at each time period (where the length of the period is a parameter, defined according to security requirements). An "ideal" refreshment scheme proceeds as follows. Initially, each pair of processors has a common private key known only to them. Every period (say, every week), a new key is chosen completely at random for each pair of processors, and miraculously handed to both processors. Such an ideal scheme is clearly "the most we can hope for". The adversary has no knowledge of the key common to a pair of processors which are nonfaulty at the current period. Using the terminology suggested before, the ideal scheme ensures that every pair of nonfaulty processors is also secure.

The schemes according to the invention achieve almost the same situation, as long as the adversary is limited to reasonable computational and eavesdropping abilities. For the purposes of the present disclosure, we use the following simple model; however, it is easy to modify the methods to operate under most practical communication models and systems, with minor changes to the method or to its properties.

The system contains n processors, and each pair of processors may communicate directly; e.g., using a dedicated communication link. We consider a synchronous system in which all processors have access to a completely synchronized and accurate clock. Execution is divided to overlapping periods of fixed length $T_p+T_c>1$, where $T_p$ is the time gap between periods and $T_c$ is the overlap. Namely, the ith period is $[iT_p,(i+1)T_p+T_c]$. Message transmission delay is always at most one time unit. However, the adversary may interfere with message transmission, by reading messages, modifying them, changing their delay or removing them, or by transmitting forged messages. If the adversary interfered in any way with the communication from processor v to processor u at period i, we say that link (u,v) was faulty at period n. Otherwise, we say that (v,u) was nonfaulty.

The adversary may also interfere with the processing. Normally, each processor executes the protocol to be described below. However, the adversary may gain control of any processor and operate it differently, having complete access to the storage of the processor and the ability to send and receive messages. If the adversary gains control of processor v at period i, we say that v is faulty at period i; otherwise, v is nonfaulty at i. At the end of the overlap between period i and the previous period i-1, i.e., at $iT_p+T_c$, each processor v computes a set of keys $\{K_{v,u}(i)\}$. Intuitively, $K_{v,u}(i)$ is the key to be used to secure communication between v and u during period i. Clearly, this is an oversimplified model for any realistic system. However, it is easy to understand and analyze the method while considering this model.

In the ideal execution, the keys $K_{v,u}(i)$ and $K_{u,v}(i)$ are identical, and they are completely unknown to the attacker. In the methods according to the second aspect of our invention, there is a tradeoff between these two goals: • Key synchronization: produce identical keys at each pair, i.e., $K_{v,u}(i)=K_{u,v}(i)$, and • Key secrecy: keep the keys $K_{v,u}(i)$ and $K_{u,v}(i)$ secret from an attacker. The methods disclosed put a stronger emphasis on keeping the keys secret. In particular, the first two methods disclosed ensure that $K_{u,v}(i)$ is unknown to the attacker whenever v and u are nonfaulty at period i, some v',u' are nonfaulty at period i-1, and the links (v',v) and (u',u) are nonfaulty at the overlap of periods i-1 and i. However, an attacker so inclined may cause the keys to differ. We later show some techniques which protect the key synchronization (i.e., u and v would compute the same key); however, these results would provide weaker protection of secrecy (i.e., require more nonfaulty links and processors).

Our constructions use *pseudorandom functions*. We briefly sketch the definition of a pseudorandom function family. For a fuller definition see Mihir Bellare and Phil Rogaway, supra. Let s be a security parameter. For every value of s, let $$F_s = \{f_a: \{0,1\}^{y(s)} \to \{0,1\}^{z(s)}\}_{w(s)a=1}$$

be a family of functions. Intuitively, we say that the collection $F=\{F_s\}$ is pseudorandom if no polynomial time bounded adversary can distinguish between a function chosen at random from $F_s$ and a random function (from $\{0,1\}^{y(s)}$ to $\{0,1\}^{z(s)}$) for every large enough s. We note that pseudo-random collections exist, given that one-way functions exist. In fact, we need only a simple case where the domain and the range are both $\{0,1\}^k$ where k is some security parameter. For k=64, the DES cryptosystem, with the key serving as the input, is believed to be a good candidate. Many other candidates are known, and there are standard efficient extensions for larger values of k.

We describe our constructions for secure link key refreshment. We begin with a simple construction and then show a variant with reduced communication requirements. Next, we show a simple extension to both constructions which ensures secrecy of link keys even if other link keys are exposed (by a poorly designed link protocol). Finally, we discuss variations which gain some protection of key synchronization ($K_{v,u}=K_{u,v}$) but require stronger assumptions to ensure key secrecy. All constructions assume that initially each processor pair of processors u,v is initiated with randomly chosen, secret values (keys) $K_{v,u}(O)=K_{u,v}(O)$.

We also assume that each processor v has a random value (key) $K_v(p)$ at any period p. This random value could be generated by a source of physical randomess or by a pseudo-random number generator secure against an attacker which dynamically gains and loses control of all processors (not at once). Such a pseudo-random number generator could be implemented using a tamper-proof hardware module or using the technique we describe in our U.S. Pat. No. 5,412,723.

An $O(n^4)$ messages construction. In this construction, at the beginning of period i, each processor v sends to each processor v' a table of $n^2$ values denoted $X_{v,v'}(u,u')[i]$, for $u,u'=1,\ldots,n$. We now describe how v computes each pair of values $X_{v,v'}(u,u')[i]$, $X_{v,u'}(u,v')[i]$. We assume without loss of generalization that $u'<v'$. First, v computes a *pseudo-random offset* R as a function of v, v', u, and u'. On possible embodiment is:

$$R_{v,v'}(u,u')=f_{Kv,u(i-1)}(u,v',u')$$

Next, v sets $X_{v,v'}(u,u')[i]$ as a function of v, v', u, u', and i, such as:

$$X_{v,v'}(u,u')[i] = \begin{cases} f_{K_{v,u}(i-1)}(v',u') \oplus R_{v,v'}(u,u') & \text{if } v>u \text{ and } v' \\ & \text{or } v>u \text{ and } v' \\ R_{v,v'}(u,u') & \text{otherwise} \end{cases}$$

where $\oplus$ represents the combination operation, and we deal with the special case v=u by setting $K_{v,v}(i)=K_v(i)$.

The new key $K_{v',u'}(i)$ is computed by v' as the exclusive OR of all the $X_{v,v'}(u,u')$ values received from different sources v and with different u values, one recommended implementation being:

$$K_{v',u'}(i) = \bigoplus_{v=1}^{n} \bigoplus_{u=1}^{n} X_{v,v'}(u,u')$$

The keys resulting from this computation are completely unknown to an attacker, even if this attacker has complete control over all processors, except u',v' during period i and some u,v during period i-1, provided that $K_{u,v}(i-1)$ and $K_{v,u}(i-1)$ were also completely unknown to the attacker, and that the links (v',v) and (u',u) were non-faulty during the overlap between period i and period i-1. This property allows secure pairs of processors to pass along the security to new pairs of nonfaulty processors.

Figure 4:
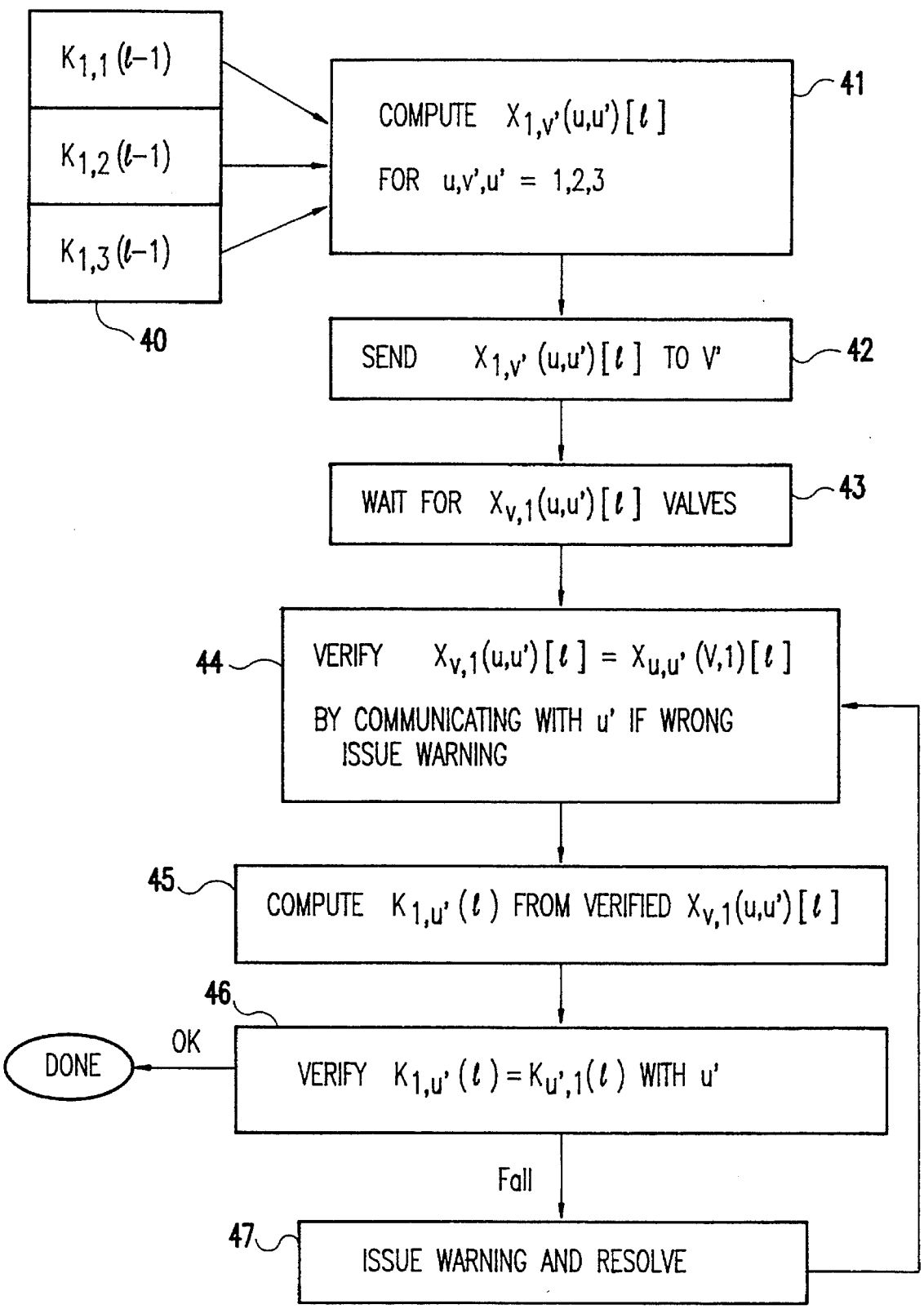
FIG. 4 is a flow chart showing the logic of an $O(n^4)$ messages construction for key synchronization according to a first embodiment of a second aspect of the invention.

FIG. 4 shows the process for the case of three processors, the method illustrated being for the steps performed at processor $P_1$. The keys, $K_{1,1}(l-1)$, $K_{1,2}(l-1)$ and $K_{1,3}(l-1)$, for the last round, l-1, stored in block 40 are used in function block 41 to compute $X_{1,v'}(u,u')[l]$ for $u,v',u'=1,2,3$. The value $X_{1,v'}(u,u')[l]$ is sent to v' in function block 42. The processor then waits in function block 43 to receive the values $X_{v,1}(u,$ u')[l] computed at the other processors. When the values are received from the other processors, a verify operation is optionally performed in function block 44 to verify that $X_{v,1}(u,u')[l]=X_{u,u'}(v,1)[l]$ by communicating with processor u'. If the verify operation fails, a warning is issued; otherwise, the processor next computes $K_{1,u'}(l)$ from the verified values in function block 45. A second compare operation is performed in function block 46 to verify that the computed $K_{1,u'}(l)=K_{u',1}(l)$ by communicating with u'. If the verification fails, a warning is issued in function block 47, and the process optionally loops back to function block 44. When the verification in the compare operation of function block 46 succeeds, then the construction process exits.

It is easy to verify that if all the messages are computed and received according to the design above then the keys of v' and u' would be synchronized; i.e., $K_{v',u'}(i)=K_{u',v'}(i)$. However, any omission or modification of the messages may result in non-synchronized keys. We later show some methods to ensure key synchronization, but with some loss of the protection of the secrecy of the keys.

An $O(n^3)$ messages construction. We now show a modification of the above method which reduces the communication requirements to $O(n^3)$ messages per period. We simply note that the above method ends all of the $X_{v,v'}(u,u')$ values from v to v' and v' XOR all of the values corresponding to the different u values. Instead, we let the sender v perform the XOR, and then each processor v would send to each other processor v' only one value per each u'; i.e., $O(n^3)$ messages. In addition, there is no need any more to generate a different random number for each u, since it is enough to use one random number for each message. The method can therefore be described by the following formula:

$$X_{v,v'}(u')[i] = \begin{cases} \oplus_{u \leq v} f_{K_{v,u}(i-1)}(v',u') & \text{if } u' < v' \\ f_{K_{v,v}(i-1)}(v',u') & \text{if } u' = v' \\ \oplus_{u \geq v} f_{K_{v,u}(i-1)}(v',u') & \text{if } u' > v' \end{cases} \quad (1)$$

Note that random number used as a pad is implemented here by $f_{K_{v,v(i-1)}}(v',u')$ As before, $K_{v,v}(i)=K_v(i)$.

Figure 5:
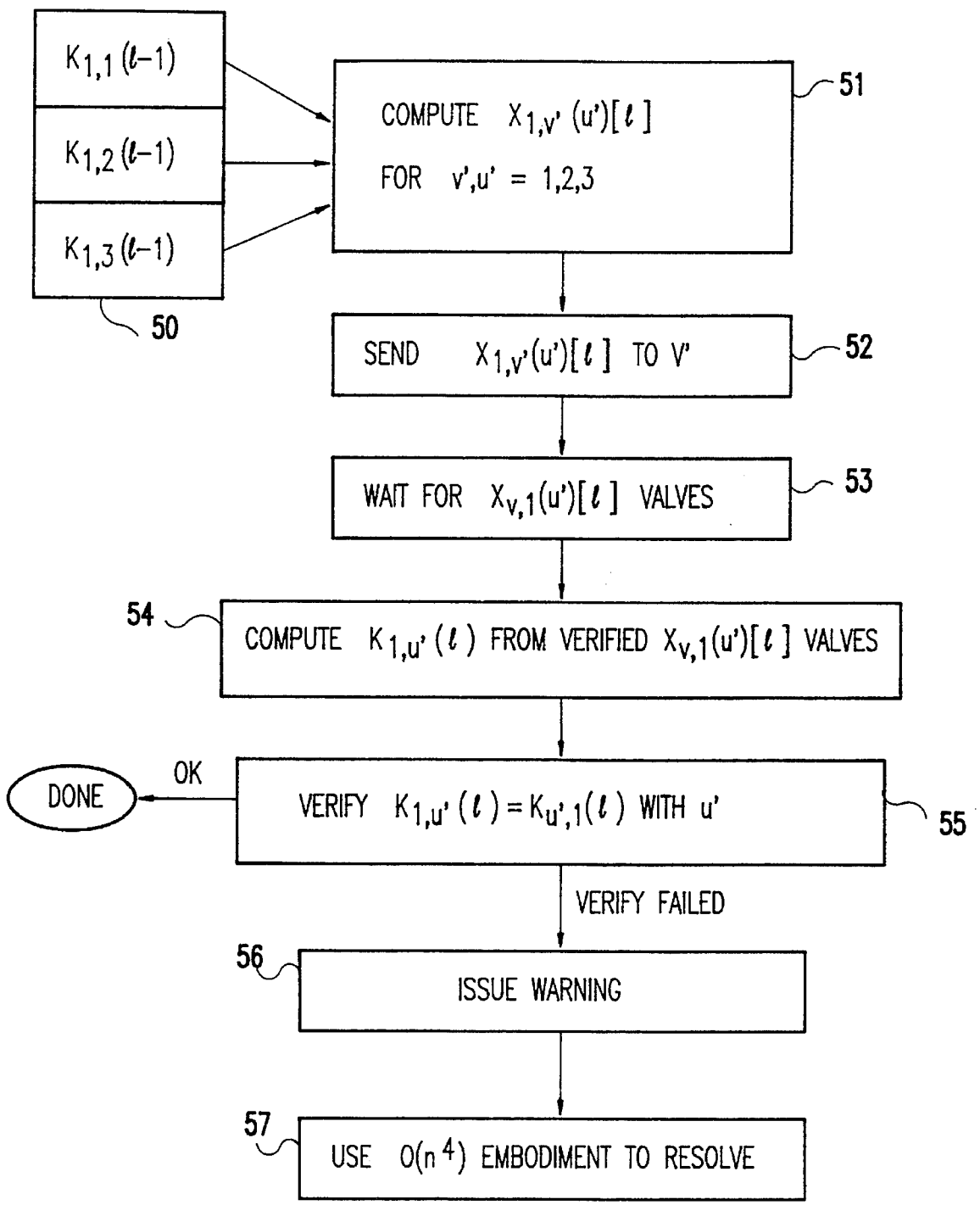
FIG. 5 is a flow chart showing the logic of an $O(n^3)$ messages construction for key synchronization according to a second embodiment of a second aspect of the invention.

FIG. 5 shows the process for the case of three processors, the method illustrated being for the steps performed at processor $P_1$. The keys, $K_{1,1}(l-1)$, $k_{1,2}(l-1)$ and $K_{1,3}(l-1)$ and for the last round, $l-1$, stored in block 50 are used in function block 51 to compute $X_{1,v'}(u')[l]$ for v',u'=1,2,3. The value $X_{1,v'}(u')[l]$ is sent to v' in function block 52. The processor then waits in function block 53 to receive the values $X_{v,1}(u')[l]$ computed at the other processors. When the values are received from the other processors, the key, $K_1,u'(l)$ is computed from the received values in function block 54. A verify operation is performed in function block 55 to verify that the computed $K_{1,u'}(l)=K_{u',1}(l)$ by communicating with u'. If the verification fails, a warning is issued in function block 56, and the $O(n^4)$ construction process shown in FIG. 4 is called in function block 57. When the verification in the compare operation of function block 55 succeeds, then the $O(n^3)$ construction process exits.

This modified method preserves the security properties of the previous method. Namely, the keys resulting are completely unknown to an attacker, even if this attacker has complete control over all processors, except u',v' during period i and some u,v during period i-1, provided that $K_{u,v}(i-1)$ and $K_{v,u}(i-1)$ were also completely unknown to the attacker and that the links (v',v) and (u',u) were nonfaulty. However, it is easy for an attacker to cause the keys not to be synchronized.

In the schemes above, the secrecy of each key depended on the use of the other keys. For example, it is easy to see that if all nonfaulty processors reveal the values of their keys at a given period, then an attacker would be able to predict future values of the keys. Of course, many applications would maintain the secrecy of the keys (in the nonfaulty processors), and then the above would not be a problem. However, we now present a simple fix that allows nonfaulty processors to reveal their keys without exposing any other keys.

The fix is by computing from $K_{v,u}$, defined as before, a new key $K'_{v,u}$. The processors would use only $K'_{v,u}$. Even if they expose the value of $K'_{v,u}$, the attacker would not gain additional information about any other keys in the same period or other periods. A simple way to compute the key $K'_{v,u}$ is as follows:

$K_{v,u}(i)=f_{K_{v,u}(i)}(v+u)$

Note that if $K_{v,u}(i)=K_{u,v}(i)$, then $K'_{v,u}(i)=K'_{u,v}(i)$. Thus, this fix preserves key synchronization.

All variations of the method presented so far provided almost no protection for key synchronization. We now discuss how to gain such protection, at the cost of losing some of the key secrecy protection. Namely, preserving key secrecy would require more secure pairs of processors and links.

We first note that as long as key secrecy is preserved, the processors may easily test for key synchronization; e.g., by using the 2PP authentication protocol. See Bird et al., supra. Therefore, in the following discussion we will consider testing a key as a simple operation (performed by running all authentication protocol).

Next, we expect that in most applications, any kind of failure would be an unusual and rare event. Therefore, it is sufficient to protect key synchronization for the first method, using $O(n^4)$ messages per period. This would still allow us to get $O(n^3)$ messages per period in periods with no failures. We use the $O(n^3)$ method, test the keys for synchronization, and use the $O(n^4)$ method only if a problem is revealed.

We note that a sufficient condition for key synchronization, i.e., for $K_{v',v'}(i)=K_{v',u'}(i)$, is that $X_{v,v'}(u,u') \oplus X_{u,u'}(u,v') = X_{v,u'}(u,v') \oplus X_{u,u'}(v,v')$, for such XOR computed by v' to be identical to the corresponding XOR computed by u'. Therefore, it is sufficient that the parties u',v' would always use either all of the values $X_{v,v'}(u,u'), X_{u,v'}(v,u'), X_{v,u'}(u,v'), X_{u,u'}(v,v')$ or none of them.

It is therefore easy to ensure key synchronization in the presence of processor and communication link outages; that is, without an attacker intentionally attempting to cause key mismatch. In this case, the parties would just use the rule above. This implies an attacker may cause the parties not to use some values from nonfaulty processors. In order to allow the parties to ignore values from j pairs of processors, and still ensure key secrecy of $K_{v',u'}(i)$, there must be at least j+1 pairs of processors $(v_1,u_1), \ldots, (v_{j+1}, u_{j+1})$ which have a secret key and are nonfaulty at period i-1, and for every l=1,...,(j+1), the links $(v_l,v')$ and $(u_l,u')$ are nonfaulty at period i.

We now extend this solution to deal with a malicious attacker who may intentionally modify messages and processing in order to cause loss of key synchronization. In this case, the values $X_{v,v'}(u,u')$ may be received, but not with the right value according to the design. This could be due to either an interception and modification of the message carrying this value or when the sender v is controlled by the attacker.

The solution is based on the fact that if two values $A=X_{v,v'}(u,u')\oplus X_{v,u}(v,u')$ and $B=X_{u,u'}(v,v')\oplus X_{v,u'}(u,v')$ held by u' are secret and different, the attacker would not be able to fool u' and v' into thinking the values are identical. This is achieved by v' and u' using an authentication protocol such as 2PP. See, again, Bird et al., supra. This fact allows a solution when at most a few (say, l) key components $X_{v,v'}(u,u')$ may be modified by the attacker, for given v',u'. In this case, we can generate a secure key $K_{v',u'}(i)$ from any collection of l+1 key components which is identical in u' and in v'. Since there are at most l modified key components, we would find a collection of l+1 synchronized collections no later than the (l+1)th time, provided that l(l+1)<n.

Figure 6:
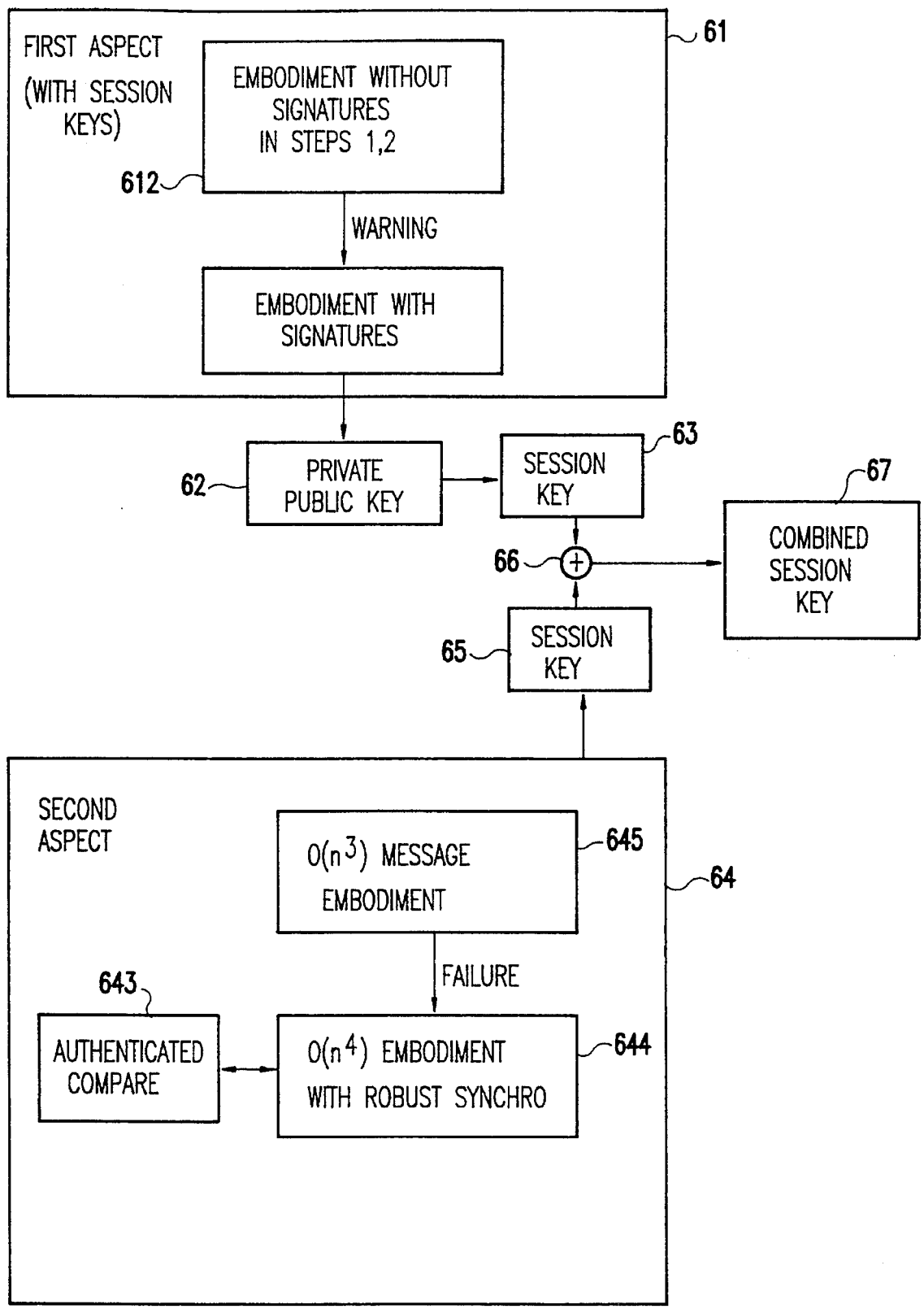
FIG. 6 is a block diagram illustrating how the two embodiments of the second aspect of the invention illustrated in FIGS. 4 and 5 may be combined.

The first and second embodiments of the second aspect of the invention may be combined as shown in FIG. 6. More particularly, the first aspect of the invention, denoted as block 61, comprises the embodiment shown in FIG. 3, denoted 612; that is, with session keys. In the first instance, the process if done without the signatures in steps 1 and 2, and if a failure is detected, a warning is issued. Upon issuance of a warning, the process is repeated with signatures in steps 1 and 2. The output of the first aspect of the invention is the private and public keys in block 62 and the session key in block 63. Meanwhile, the second aspect of the invention, denoted as block 64, comprises the $O(n^3)$ messages construction embodiment 645 shown in FIG. 5 and the $O(n^4)$ messages construction embodiment 644 shown in FIG. 4. The $O(n^4)$ embodiment 644 is invoked only when their is a verification failure in the $O(n^3)$ embodiment 645. The O(n4) embodiment 644 includes the authentication compare 643 as part of its verification process, as described above. The output of the second method is a session key in block 65. Essentially, it is sufficient to always XOR the two session keys generated by the two methods 61 and 64 in XOR block 66 to provide a combined session key in block 67.

In some applications, a key needs to be shared among more than two processors. The methods according to the invention can be extended to compute such a key directly. Alternatively, an authenticated key exchange protocol can be used to distribute this key among the desired processors, using pairwise communication with the pairwise keys supplied by the methods according to the invention.

While the invention has been described in terms of a several preferred embodiments, those skilled in the art will recognize that the invention can be practiced with modification within the spirit and scope of the appended claims.

Having thus described our invention, what we claim as new and desire to secure by Letters Patent is as follows:

1. A method for securing the communication and distributed computation between and among processors connected by a communication network, said method maintaining secret values for a sequence of periods, each secret value shared by two or more processors for one or several periods and comprising the steps of:

securely storing secret values in each processor;

calculating in each processor, at the end of a period, messages to be sent to other processors as a function of values held in said processor at that time;

transferring said messages to said processors by means of said communication network;

calculating in each processor new secret values as a function of messages received from said processors; and periodically replacing the secret values by selecting at random public and private keys of a public-key cyrptosystem;

signing the public key with the old secret value stored in the processor; and sending the signed public key to other processors connected to said communication network.

2. The method recited in claim 1 wherein the messages received from the other processors are signed, further comprising the step of verifying the signatures of the received messages.

3. A method for securing the communication and distributed computation in a distributed dam processing system comprising a plurality of processors connected by a communication network, said method maintaining secret values for a sequence of periods, each secret value shared by two or more processors for one or several periods and comprising the steps of:

each processor $P_i$ selecting in each round new public and private keys, and broadcasting the public key;

broadcasting by each processor $P_j$ the vector $v_j$ of all public keys received in this round;

verifying by each processor the received vectors $v_j$;

issuing a warning if the step of verifying fails; and erasing at each processor old private keys and writing the new private key in secure storage.

4. The method of claim 3 further comprising the step of generating by each pair of processors a fresh session key using the new public keys.

5. The method of claim 4 further comprising the steps of:

storing the old private key in a secure storage in the processor;

storing the new private key in a first register the new public key in a second register section;

accessing the secure storage for the old private key to sign the fresh session key held in said first register;

exchanging the signed session keys between said pair of processors; and verifying at each processor the received signed session key using old public keys from a previous session.

6. The method of claim 3 further comprising the step of echoing by each processor $P_j$ the public key received from each of the other processors Pi, signed using the old session key of $P_i$ and $P_j$, back to the sending processor, $P_i$.

7. The method of claim 3 wherein the step of selecting new private and public keys by each processor $P_i$ is performed by using a random number generator and a public/private key generator, said method further comprising the steps of:

storing the old private key in a secure storage in the processor;

storing the new private key in a first register and the new public key in a second register;

accessing the secure storage for the old private key to sign the new public key held in said first register; and receiving the signed new public keys broadcast by processors $P_j$ and temporarily storing the received new public keys.

8. The method recited in claim 7 further comprising the steps of:

storing the old public keys in a third register;

accessing the old public keys stored in said third register; and verifying the signatures of the received new public keys from processors $P_j$ using the old public keys accessed from said third register.

9. The method of claim 8 wherein all public keys broadcast by each processor $P_j$, together with the new public key of processor $P_i$, form a vector $v_i$, further comprising the steps of:

signing the vector $v_i$ using the old private key of the processor $P_j$; and broadcasting the signed vector $v_i$ to the processors $P_j$.

10. The method recited in claim 9 further comprising the steps of:

receiving the vectors $v_j$ broadcast by processors $P_j$ and temporarily storing the received vectors $v_j$ in a fifth register; and verifying the signatures of said vectors $v_j$.

11. The method of claim 9 further comprising the steps of:

receiving and temporarily storing the signed vectors $v_j$ from the processors $P_j$;

storing the old public keys of all the processors in a third register;

accessing said third register to verify the signatures of the received new public keys from processors $P_j$;

temporarily holding the verified new public keys in a fourth register;

accessing said fourth register to read the new public keys from processors $P_j$ and, together with the new public key for processor $P_i$ held in said first register, forming a vector $v_i$;

signing the vector $v_i$ using the old private key stored in the secure storage;

and broadcasting the signed vector $v_i$.

12. A method of maintaining secret keys shared between pairs of processors v and v' in distributed processing system comprising n processors connected by a communication network in the presence of a mobile, transient adversary that occasionally breaks into processors of the distributed processing system, each pair of processors communicating directly using a dedicated communication link of the communication network, said method comprising the steps of:

at the beginning of each period i, sending by each processor v to each processor v' a table of $n^2$ values denoted $X_{v,v'}(u,u')[i]$, for processor pairs $u,u'=1,\ldots,n$;

computing by each processor v each pair of values $X_{v,v'}(u,u')[i]$, $X_{v,u'}(u,v')[i]$ by first computing a pseudo-random offset R as a function of v, v', u, and u', and then setting, by each processor v, $X_{v,v'}(u,u')[i]$ as a function of v, v', u, u', and i; and computing a new key $K_{v',u'}(i)$ by processor v' as an exclusive OR of all the $X_{v,v'}(u,u')$ values received from different sources v and with different u values, whereby the keys resulting from this computation are completely unknown to an attacker, even if this attacker has complete control over all processors, except u',v' during period i and some u,v during period i-1, provided that $K_{u,v}(i-1)$ and $K_{v,u}(i-1)$ were also completely unknown to the attacker, and that the links (v',v) and (u',u) were non-faulty during the overlap between period i and period i-1.

13. The method recited in claim 12 wherein u'<v' and the pseudo-random offset R is computed as:

$$R_{v,v'}(u,u')=f_{K_{v,u}(i-1)}(u,v',u').$$

14. The method recited in claim 13 wherein processor v sets $X_{v,v'}(u,u')[i]$ as a function of v, v', u, u', and i as:

$$X_{v,v'}(u,u')[i] = \begin{cases} f_{K_{v,u}(i-1)}(v',u') \oplus R_{v,v'}(u,u') & \text{if } v > u \text{ and } v' \\ R_{v,v'}(u,u') & \text{or } v < u \text{ and } v' \\ & \text{otherwise} \end{cases}$$

where ($\oplus$) represents the combination operation.

15. The method recited in claim 14 wherein the new key $K_{v',u'}(i)$ is computed by processor v' as an exclusive OR of all the $X_{v,v'}(u,u')$ values as:

$$K_{v',u'}(i) = \bigoplus_{v=1}^{n} \bigoplus_{u=1}^{n} X_{v,v'}(u,u').$$

* * * * *